United States Patent [19]

Homan et al.

[11] Patent Number: 4,614,760

[45] Date of Patent: Sep. 30, 1986

[54] LOW CONSISTENCY, ONE-PART SILICONE ELASTOMERS

[75] Inventors: Gary R. Homan; Chi-Long Lee, both of Midland, Mich.

[73] Assignee: Dow Corning Corporation, Midland, Mich.

[21] Appl. No.: 780,747

[22] Filed: Sep. 27, 1985

[51] Int. Cl.[4] ............................................. C08L 83/04
[52] U.S. Cl. ..................................... 524/860; 528/24; 528/34; 528/37; 528/41; 525/474; 525/477
[58] Field of Search ...................... 528/24, 34, 41, 37; 525/477, 474; 524/860

[56] References Cited

U.S. PATENT DOCUMENTS

| | | | |
|---|---|---|---|
| 3,766,127 | 10/1973 | Clark et al. | 260/375 B |
| 3,766,128 | 10/1973 | Brady et al. | 260/375 B |
| 3,817,909 | 6/1974 | Toporcer et al. | 260/375 B |
| 4,020,044 | 4/1977 | Crossan et al. | 260/46.5 UA |
| 4,347,336 | 8/1982 | Homan et al. | 528/34 |

*Primary Examiner*—Melvyn I. Marquis
*Attorney, Agent, or Firm*—Edward C. Elliott

[57] ABSTRACT

A one-part silicone elastomeric composition that is flowable or easily extruded is prepared by mixing a hydroxyl endblocked polydiorganosiloxane, a difunctional silane having two amido radicals, and an organic peroxide suitable for vulcanizing silicone rubber. A nonacidic filler is optional. After being put in place, the composition is exposed to moisture to activate a chain extension reaction that increases the molecular weight of the polydiorganosiloxane, to improve the physical properties of the cured silicone elastomer. After chain extension has taken place, the composition is heated to activate the organic peroxide, thereby crosslinking the composition into a silicone elastomer. The composition is useful as a potting and encapsulating material.

11 Claims, No Drawings

LOW CONSISTENCY, ONE-PART SILICONE ELASTOMERS

BACKGROUND OF THE INVENTION

1. Field of the Invention

This invention relates to a low consistency one-part silicone composition that is curable by the combination of exposure to moisture, then to heat, to produce a silicone elastomer.

2. Background Information

Silicone compositions have been produced having a viscosity that is sufficiently low so that the composition can be poured or easily extruded into place and then cured. The basic polymer of such compositions has a short chain length in order to be of sufficiently low viscosity to allow the finished composition to be pourable or easily extruded. Such short chain length polymers do not yield cured products with sufficiently high tensile strength and elongation for many applications.

One method of solving this problem has been to use a polymer with mono-functional end groups in conjunction with another difunctional material with which it can react to produce a longer chain polymer. Before reaction, the mixture has a low viscosity; after reaction, the resulting polymer has a higher viscosity. This concept has been further refined by also adding a polyfunctional material to cause the polymer mixture to become crosslinked, as well as chain extended.

Silicone compositions which are in two-part packages that cure when mixed together have been produced. These are not storable as a one-part system. Because the mixing must be done at the time of use, the manufacturer does not have control of the process. Once mixed, the material will cure if not used immediately, and product may be wasted. For these reasons, one-part, storable systems were developed which cure when exposed to moisture. In U.S. Pat. No. 3,766,127, issued Oct. 16, 1973, Clark et al. disclose a composition consisting essentially of a hydroxyl endblocked polydiorganosiloxane, a difunctional amido silane, and a trifunctional amido silane. When the composition is exposed to moisture at room temperature, the ingredients react to produce a low modulus silicone elastomer. Similar compositions are disclosed in U.S. Pat. No. 3,766,128, issued Oct. 16, 1973, by Brady and Clark using a trifunctional amino silane as the crosslinking ingredient and in U.S. Pat. No. 3,817,909, issued June 13, 1974, by Toporcer and Crossan using a polyfunctional aminoxy silane compound The reaction rates between the various reactive groups must be carefully selected in order to produce a cured product that is both crosslinked and chain extended.

In U.S. Pat. No. 4,020,044, issued Apr. 26, 1977, Crossan et al. show that hydroxyl endblocked polydiorganosiloxane can be reacted with a difunctional silane such as methylvinyldi(N-methylacetamido)silane to yield higher molecular weight products. The higher molecular weight product can then be compounded with filler and a vinyl specific organic peroxide to provide stocks which can be heat cured. They do not teach that a one-part, storage stable composition can be produced that can then be cured by exposure to moisture followed by exposure to heat.

SUMMARY OF THE INVENTION

An object of the present invention is to provide a one-part silicone composition that is flowable or easily extrudable. After being put in place, the composition is exposed to moisture to activate a chain extension reaction that increases the molecular size of the polydiorganosiloxane, thereby improving the physical properties of the cured composition. After chain extension has taken place, the composition is heated to activate an organoperoxide vulcanizing agent, thereby crosslinking the composition into a silicone elastomer.

The essential ingredients of the present invention are a hydroxyl endblocked polydiorganosiloxane, a difunctional chain extending agent, and an organoperoxide crosslinking agent.

Another object of the present invention is to provide a silicone composition which is easily formed into place. The composition, after curing, is a silicone elastomer having improved physical properties.

The composition of the present invention is useful as a casting material, a potting material, a caulking material, a coating material, or a molding material.

DESCRIPTION OF THE INVENTION

This invention relates to a composition, stable in the absence of moisture, comprising a product obtained by mixing (A) 100 parts by weight of a hydroxyl endblocked polydiorganosiloxane where the organic radicals are monovalent radicals selected from the group consisting of methyl, vinyl, phenyl, and 3,3,3-trifluoropropyl radicals, the organic radicals being at least 50 mol percent methyl radicals, the viscosity of the polydiorganosiloxane being from 0.05 Pa·s to 100 Pa·s at 25° C., (B) a silane selected from the group consisting of a silane of the formula $CH_3RSiX_2$ in which R is selected from the group consisting of methyl and vinyl radicals, X is a monovalent amido radical selected from the group consisting of

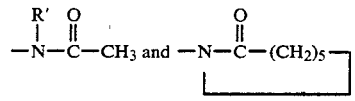

where R' is a monovalent radical selected from the group consisting of an alkyl radical of from 1 to 4 carbon atoms per radical and phenyl radical and a silane of the formula

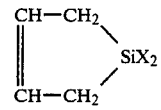

in which X is as defined above, the silane being present in an amount sufficient to provide at least one mole of silane per mole of available hydroxyl radical in the composition, (C) from 0 to 150 parts by weight of non-acidic filler, and (D) from 0.1 to 5 parts by weight of an organic peroxide suitable for vulcanizing silicone rubber.

The hydroxyl endblocked polydiorganosiloxanes (A) can have a viscosity of from 0.05 Pa·s to 100 Pa·s at 25° C. This viscosity range provides compositions which are flowable or easily extruded. The compositions can therefore function properly as potting and encapsulating materials, flowing over and/or through electrical devices to give a protecting coating. The preferred viscosity range for use in compositions to be used for potting and encapsulation is from 0.1 Pa·s to 25 Pa·s at 25° C. These low viscosity compositions can also be used in cloth coating applications, for paper coating, and impregnating applications. Because the compositions have a low viscosity, they can be applied without the use of solvents which are necessary when using high viscosity polymers. This solvent-free process is lower cost and also eliminates the problem of waste solvent disposal. Viscosities greater than about 25 Pa·s at 25° C. are suitable for producing caulking materials that may or may not flow upon extrusion from their storage tubes, depending upon the filler loading; coating materials that may be dispersed in solvent for application; and molding materials that may be easily formed because of their relatively low viscosity. The hydroxyl endblocked polydiorganosiloxanes have organic radicals selected from methyl, vinyl, phenyl, and 3,3,3-trifluoropropyl radicals. The organic groups of the polydiorganosiloxane contain at least 50 mol percent methyl radical, and no more than 10 mol percent vinyl radicals based on the total number of organic radicals in the polydiorganosiloxane. Other monovalent hydrocarbon radicals and halohydrocarbon radicals in small amounts can be present in the polydiorganosiloxane. The diorganosiloxane units of the hydroxyl endblocked polydiorganosiloxane can be, for example, dimethylsiloxane, methylvinylsiloxane, diphenylsiloxane, methylphenylsiloxane, and 3,3,3-trifluoropropylmethylsiloxane. The term polydiorganosiloxane as used herein does not preclude small amounts of other siloxane units such as monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The silane, (B), selected from the group consisting of a silane of the formula $CH_3RSiX_2$ in which R is selected from the group consisting of methyl and vinyl radicals, X is a monovalent amido radical selected from the group consisting of

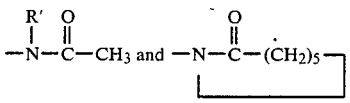

where R' is a monovalent radical selected from the group consisting of an alkyl radical of from 1 to 4 carbon atoms per radical and phenyl radical and a silane of the formula

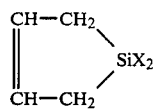

in which X is as defined above is a key ingredient of the compositions of this invention. In the formula, R is a methyl or vinyl radical. R' represents a monovalent radical of the group methyl, ethyl, propyl, butyl, and phenyl. The silanes include, for example, methylvinyldi-(N-methylacetamido)silane dimethyldi-(N-methylacetamide)silane, methylvinyldi(N-ethylacetamido)silane, methylvinyldi-(N-phenylacetamido)silane, silacyclopentyldi-(N-methylacetamido)silane, methylvinyldi-(epsilon-caprolactam)silane and dimethyldi(epsilon-caprolactam)silane. These amido silanes can be prepared by reacting the appropriate N-organoacetamide with the appropriate chlorosilane. This method is further detailed in U.S. Pat. No. 3,776,933, issued Dec. 4, 1973, "Method of Preparing Amidosilanes," hereby incorporated by reference for the preparation of the amidosilanes.

An illustration of the method for preparing the amidosilanes is as follows: mixing a sodium salt of N-methylacetamide with methylvinyldichlorosilane in an inert organic solvent such as toluene, filtering the by-produced sodium chloride from the toluene-product solution and thereafter removing the toluene by vacuum distillation to obtain the product, methylvinyldi-(N-methylacetamido)silane.

The amount of silane (B) to be used is sufficient to provide at least one mole of silane per mole of available hydroxyl radical in the composition. During the preparation of the composition, it is proposed that one of the monovalent amido radicals will react with each hydroxyl radical on the polydiorganosiloxane. This reaction blocks further reaction between molecules until moisture is made available to the composition, as during the first part of the curing step where the composition is exposed to moisture after being formed to the desired shape in the desired location. To assure at least one mole of silane for each hydroxyl radical on the polydiorganosiloxane, it is necessary to add sufficient excess silane to react with any other hydroxyl radicals which may be present in the composition. Such other hydroxyl radicals may be present as hydroxyl radicals on the filler, if present, or as water absorbed on the filler or otherwise present in the system. If sufficient silane is not added, the composition will not maintain its viscosity during storage, but will increase in viscosity during storage.

The amount of water in the composition is desirably kept to a reasonable minimum. The ingredients do not have to be completely water-free, but, because any water present must be reacted with silane to insure shelf life, it is preferred to have as little water as practical. Therefore, the most economical ingredients, particularly fillers, do not contain any appreciable quantity of moisture. The minimum amount of silane required can be established by simple experimentation, measuring the viscosity of the composition with time, or by calculating the moles of silane necessary to react with each mole of hydroxyl radical available in the composition which can react with the silane.

The compositions of this invention can also contain fillers. The fillers can be present in amounts of from 0 to 150 parts by weight per 100 parts by weight of (A), preferably from 5 to 50 parts by weight of filler per 100 parts by weight of (A). These fillers can be any non-acidic, essentially anhydrous filler. Such fillers include, for example, calcium carbonate, ferric oxide, nonacidic carbon black, diatomaceous earth, alumina, titanium dioxide, glass micro balloons, organic fillers, resins, such as silicone resins, ground quartz, calcium sulphate, and the like. The filler may be treated with a silane to yield a surface more compatible with the polydiorganosiloxane. It is also possible to use a limited amount of a reinforcing filler, such as fume silica, if the surface of the filler is treated to remove the hydroxyl radicals normally present, such as treating with hexamethyldisilazane. The amount of reinforcing filler that can be used is limited as the viscosity of the composition increases rapidly upon addition of reinforcing filler.

The cure of the composition of the instant invention is completed through the use of from 0.1 to 8 parts by weight of an organic peroxide per 100 parts by weight of (A). Suitable peroxides include benzoyl peroxide, tertiary butylperbenzoate, dicumyl peroxide, 2,4-dichlorobenzoyl peroxide, di-tertiary-butyl peroxide, para-chlorobenzoyl peroxide, and 2,5-bis-(tert.-butylperoxy)-2,5-dimethylhexane. As is well-known in the art, certain peroxides, such as 2,4-dichlorobenzoyl peroxide, will properly cure silicone rubber in contact with air and also whether or not there are any unsaturated side groups in the silicone molecule. Other peroxides, such as 2,5-bis-(tert.butylperoxy)-2,5-dimethylhexane require that unsaturated side groups, such as vinyl, be present in the polydiorganosiloxane (A) or in the silane (B) in order for a proper cure to take place.

Other conventional additives can be used as long as they are neutral or basic, including dyes, pigments, antioxidants, heat stability additives, and the like.

The compositions are preferably mixed by first combining the hydroxyl endblocked polydiorganosiloxane and filler, if used, to make a mixture with the filler well dispersed. The resulting mixture is preferably deaired and then the silane and organic peroxide are added and mixed into the polymer/filler mixture. This mixing is done under essentially anhydrous conditions, that is, the addition of the silane and the subsequent mixing are carried out in such a manner as to prevent the contact of the silane or the mixture with any moisture present in the atmosphere. If moisture is allowed to contact the mixture either during mixing or later during storage, the ingredients will react to give a higher viscosity, which is not desired until after the composition is formed into the desired shape in the desired location. After the silane and organic peroxide, plus any other additives, are added without allowing contact with moisture, the mixture is mixed until homogeneous. The composition is then put into containers for storage without allowing contact with moisture and sealed to prevent any contact with moisture during the storage period. The one-package compositions are stable during storage if the essentially moisture-free conditions are maintained, provided that sufficient silane has been added during the preparation so that there is present at least one mole of silane for each mole of hydroxyl radical available for reaction in the composition. The compositions of the instant invention allow for improved methods of preparation in that the ingredients need not be completely dried before use. For example, the fillers can be commercially purchased and used as received without the vigorous drying sometimes required by prior art. Drying the fillers may increase the storage stability further, and reduce the amount of silane required, but it is not necessary in order to provide a commercial, storable composition.

The compositions of the invention are stored under anhydrous conditions because the silanes are hydrolyzable when contacted by moisture. The compositions of the present invention are also adversely affected by acidic materials and thus the ingredients used in making the compositions of this invention should be neutral or basic to litmus paper when a small amount of the particular ingredient is placed in water.

The compositions of the invention are particularly useful in that the viscosity of the composition is low enough so that the composition will flow or can be easily extruded. The compositions are useful for electronic potting and encapsulating applications where an elastomeric material is needed to flow into voids to provide electrical insulation and protection from the external environment. The low viscosity allows the composition to flow into tiny voids and thus provides more complete protection than would be obtainable by using nonflowable compositions such as are provided by higher molecular weight polymers. Such nonflowable compositions would not fill voids to the extent obtainable by using flowable compositions. It is desirable to use higher molecular weight polymers because the higher molecular weight polymers customarily yield higher physical strengths in the cured product.

The unique composition of the instant invention allows a combination of the low viscosity of lower molecular weight polymers and the higher physical properties ordinarily associated with the higher molecular weight polymers. The unique composition is used in a special method of producing a cured silicone elastomer. First, the composition is prepared by mixing the ingredients as has been described above. The composition can be used immediately after mixing, or it may be stored for a period of time as long as the composition is stored without allowing it to contact moisture.

When it is desired to produce a cured elastomer from the composition, it is formed to the desired shape in the desired location. This forming step can be of any of the well-known methods of shaping flowable or paste-like materials. The forming step can be pouring the composition out of its storage container into a form or container, such as in the case of a casting or encapsulation process. If the process is the production of a mold, the forming process can be pouring the composition over a pattern that has been placed in a container. If the composition is being used as a caulk or sealer, it may be poured or extruded into a crack or joint. The composition can be formed against a substrate by processes such as dip coating, roll coating, or calendering. The composition can also be formed by extruding it into a shaped article either with or without a support. As is well-known, the method of forming is dependent upon the process chosen and upon the viscosity of the composition being used. The method of this invention allows the use of lower viscosity compositions than normally used and obtaining the cured physical properties typical of compositions containing higher molecular weight polymers. This is due to the unique two-stage cure system of the instant invention.

After the composition is formed into a shape in the desired location, the composition is exposed to moisture. Moisture reacts with the composition to chain extend the polydiorganosiloxane, creating a higher molecular weight polymer. After this reaction has taken place, the composition is heated to a temperature sufficient to activate the organic peroxide to complete the crosslinking of the composition into a cured silicone elastomer. Thus, the composition of the instant invention has both the low consistency characteristics of mixtures manufactured using low molecular weight polymers and the physical properties, after cure, which are typical of compositions manufactured from higher molecular weight polymers.

A particular embodiment of the instant invention, containing bound water, can also be used for applications where thick sections of the elastomer are desired, as in mold making, for example. The chain extention reaction described above requires moisture in the reaction. This moisture normally comes from the atmosphere, diffusing through the thickness of the elastomer to react in the interior. Normally, when the composition is exposed to an atmosphere of approximately 50 percent relative humidity at 25° C., a sheet that is 1.6 mm thick requires about 16 hours for the moisture to diffuse from the upper exposed surface to the enclosed lower surface. A sheet of 3 mm thickness would require about 30 hours to chain extend throughout, and a sheet of 6 mm thickness would require several days. The diffusion time is dependent upon the relative humidity. For thick sections, such as over 3 or 4 mm, water bound in hydrated salts or encapsulated in thermoplastic microspheres can be added to the composition during its preparation. When it is desired to cure the composition, the composition is heated to release the water needed for the chain extension reaction, then the composition is further heated to activate the organic peroxide causing the composition to complete the cure by crosslinking into an elastomer. The hydrated salts or microspheres must release their water at a temperature below the activation temperature of the peroxide so that the chain extension reaction can take place before the crosslinking reaction. Microcapsules were filled with water by gently stirring in distilled water while heating to 50° C. After 24 hours, the microcapsules were approximately 67 percent by weight water and the temperature had sealed the surface of the microcapsule. The water can be released from the microcapsules by heating them to a temperature of 70° C. In this embodiment, the water necessary for the chain extension reaction is already distributed throughout the thickness of the formed composition so it is not necessary that moisture diffuse from the surface. Thus, chain extension in thick sections is accomplished in a practical manner by merely heating the composition to a temperature sufficient to release the water.

The above embodiment is particularly useful in mold making. The low viscosity of the composition allows the composition to flow over the pattern and into any surface detail. After the pattern has been covered with the composition to the desired thickness, the assembly is heated to release the bound water in the composition causing the chain-extension reaction to take place. After the polydiorganosiloxane has been chain extended, the assembly is further heated to activate the organic peroxide and crosslink the composition into a silicone elastomer. Because the chain extension occurs before crosslinking, the physical properties of the cured silicone elastomer are higher than expected for low viscosity polymers.

The following examples are presented for illustrative purposes only and should not be construed as limiting the invention which is properly delineated in the claims. All parts are parts by weight.

EXAMPLE 1

This example illustrates the three essential ingredients of this invention.

A. A composition was prepared consisting of 100 parts of a hydroxyl endblocked polydimethylsiloxane having a viscosity of 1.1 Pa·s at 25° C., and 10 parts of a 50 weight percent active 2,4-dichlorobenzoyl peroxide paste. The homogeneous mixture was placed in a chase and spread into a sheet about 1.6 mm thick. The sheet was allowed to sit for 18 hours, exposed to the atmosphere at 23° C. and 50 percent relative humidity, then heated by placing in a press at 130° C. for 10 minutes. After cooling, the sheet was a sticky gum.

B. The procedure of A was repeated except that 1.6 parts of methylvinyldi(N-methylacetamido)silane chain extender was also added. The cured sheet was an elastomer with a cured, dry surface.

C. The procedure of A was repeated except that 2.5 parts of tertiary butylperbenzoate was used instead of the 2,4-dichlorobenzoylperoxide paste. The tertiary butylperbenzoate is a vinyl specific catalyst when used in silicone rubber. The sheet was pressed at 175° Ç. for 10 minutes to cure. After cooling, the sheet was a sticky gum.

D. The procedure of C was repeated except that 1.6 parts of methylvinyldi(N-methylacetamido)silane was also added. The cured sheet was an elastomer with a cured dry surface.

E. The procedure of C was followed except that 20 parts of a fume silica with a surface area of 250 $m^2/g$ was also added. The silica had been treated to replace surface hydroxyl groups with trimethylsiloxy groups. The cured sheet was a sticky gum.

F. The procedure of D was followed except that 20 parts of the silica of E was also added. The mixture of polydimethylsiloxane and treated silica was no longer flowable after the addition of the methylvinyldi(N-methylacetamido)silane. The cured sheet was an elastomer with a cured dry surface.

The above experiments illustrate that a hydroxyl endblocked polydiorganosiloxane, methylvinyldi(N-methylacetamido)silane, and a peroxide can be cured to yield a silicone elastomer, as shown by compositions B, D, and F. Compositions not including the chain extender, such as compositions A, C, and E, do not yield elastomers.

EXAMPLE 2

This example illustrates the use of fillers to produce useful elastomers that are flowable before curing.

A. A composition was prepared by mixing together 100 parts of a hydroxyl endblocked polydimethylsiloxane with an approximate number average molecular weight of 40,000 containing a small amount of cyclic polydimethylsiloxane impurity, so that the combination had a viscosity of 13.5 Pa·s, 30 parts of ground quartz with an average particle size of 5 micrometres, 2 parts of methylvinyldi(N-methylacetamido)silane, and 2 parts of 2,5-bis(tert-butylperoxy)-2,5-dimethylhexane. This mixture contained approximately 0.004 moles of hydroxyl radical in the polydimethylsiloxane and approximately 0.009 moles of the methylvinyldi(N-methylacetamido)silane. The mixture was flowable. The mixture was placed in a chase and allowed to flow into a sheet. The sheet was exposed to the atmosphere for 18 hours, then cured in a press for 10 minutes at 175° C. The cured sheet was tested for physical properties in accordance with ASTM D 2240 for durometer, ASTM D 412 for tensile strength and elongation, and ASTM D 624 for tear strength. The 100% modulus is the tensile stress at an elongation of 100%. The results were as shown in Table I.

B. The composition of A was repeated with the further addition of 14.7 parts of a resinous filler. The resinous filler was a 65 percent by weight solids solution in xylene of a benzene soluble resin copolymer of triorganosiloxy units and $SiO_2$ units in the mole ratio of about 0.7 mole of triorganosiloxy units per mole of $SiO_2$ unit, where the triorganosiloxy units are trimethylsiloxy units and dimethylvinylsiloxy units and the resin copolymer has from 1.4 to 2.2 weight percent vinyl radical. This mixture was cured and tested as in A. The results were as shown in Table I. The compositions show useful properties even though they are made with polydimethylsiloxane of low enough viscosity to yield a flowable composition.

TABLE I

| Composition | A | B |
|---|---|---|
| Durometer, Shore A | 29 | 31 |
| Tensile Strength, MPa | 1.31 | 1.29 |
| Elongation, percent | 235 | 150 |
| 100% Modulus, MPa | 0.52 | 0.69 |
| Tear Strength, kN/m | 1.92 | 2.1 |

MPa = megapascals
kN/m = Kilonewtons per meter

EXAMPLE 3

A series of compositions were prepared using the ingredients of Example 2, except that in place of the ground quartz filler, a diatomaceous earth treated with methylvinyldichlorosilane was used. The diatomaceous earth was treated by mixing a quantity of diatomaceous earth in a closed container with approximately 2.5 percent by weight of methylvinyldichlorosilane based upon the weight of the diatomaceous earth. After mixing for 1 hour, the container was opened and the mixture heated for 4 hours at 150° C. to remove any unreacted silane. The compositions were prepared, cured, and tested as in Example 2. The compositions and test results were as shown in Table II. The compositions with 50 parts and above of diatomaceous earth were of a consistency that could be extruded from a storage cartridge such as used for caulking material. These compositions with less than 50 parts of diatomaceous filler were of flowable consistency.

TABLE II

| Formulation, parts | | | | | | |
|---|---|---|---|---|---|---|
| polydimethylsiloxane | 100 | 100 | 100 | 100 | 100 | 100 |
| diatomaceous earth | 30 | 30 | 40 | 50 | 60 | 100 |
| resinous filler | 14.7 | 0 | 0 | 0 | 0 | 0 |
| chain extender | 2 | 2 | 2 | 2 | 2 | 2 |
| catalyst | 2 | 2 | 2 | 2 | 2 | 2 |
| Physical Properties | | | | | | |
| Durometer, Shore A | 45 | 43 | 51 | 54 | 58 | 78 |
| Tensile Strength, MPa | 3.32 | 3.27 | 3.72 | 4.41 | 4.82 | 5.37 |
| Elongation, percent | 152 | 157 | 170 | 150 | 135 | 110 |
| 100% Modulus, MPa | 2.34 | 2.14 | 2.41 | 3.31 | 4.00 | 5.03 |
| Tear Strength, kN/m | 3.85 | 3.85 | 2.62 | 5.60 | 6.30 | 9.45 |

Chain extender: methylvinyldi(N—methylacetamido) silane

EXAMPLE 4

A comparison was made using polydimethylsiloxane of different average chain lengths. The amount of methylvinyldi(N-methylacetamido)silane was varied to hold the mole ratio of silane to hydroxyl radical in the polymer approximately constant. In this example, the moisture necessary to activate the chain extension mechanism was derived from microcapsules containing water. The microcapsules were mixed into the formulation rather than exposing the mixture to the moisture in the air for a relatively long period of time. These microcapsules were resinous spheres that were filled with water by gently stirring in distilled water for 24 hours at 50° C. The microspheres ended up 67 percent by weight water. The water could be released by heating to 70° C.

A. A composition was prepared by gently mixing 100 parts of a hydroxyl endblocked polydimethylsiloxane having a viscosity of 13 Pa·s at 25° C., 30 parts of diatomaceous earth treated with methylvinyldichlorosilane, 2 parts of water, enclosed in the above described resin microcapsules, 2 parts of methylvinyldi(N-methylacetamido)silane and 2 parts of 2,5-bis(tert-butylperoxy)-2,5-dimethylhexane. The mixture was placed in a chase and heated for 1 hour at 70° C. to release the water and activate the chain extension reaction. The sheet was then cured by heating in a press for 10 minutes at 175° C. The sheet was then tested as in Example 2. The results were as shown in Table III.

B. The composition of A was repeated, except a polydimethylsiloxane having a viscosity of 1.34 Pa·s at 25° C. was used. There were 8 parts of the silane used in place of the 2 parts used in A. The mixing, curing, and testing were as in A. The results were as shown in Table III.

C. The composition of A was repeated, except a polydimethylsiloxane having a viscosity of 0.12 Pa·s at 25° C. was used. There were 12 parts of the silane used in place of the 2 parts used in A. The mixing, curing, and testing were as in A. The results were as shown in Table III.

TABLE III

| | A | B | C |
|---|---|---|---|
| Composition | | | |
| Polymer viscosity, Pa·s | 13.0 | 1.34 | 0.12 |
| Parts of chain extender | 2.0 | 8.0 | 12.0 |
| Viscosity with filler, Pa·s | 75.0 | 13.0 | 2.8 |
| Cured Properties | | | |
| Durometer, Shore A | 41 | 54 | 69 |
| Tensile Strength, MPa | 2.65 | 2.69 | 1.65 |
| Elongation percent | 110 | 60 | 20 |
| 100% Modulus, MPa | 1.72 | — | — |
| Tear Strength, kN/m | 3.85 | 3.32 | 2.1 |

Chain extender: methylvinyldi(N—methylacetamido)silane

That which is claimed is:

1. A composition, stable in the absence of moisture, comprising a product obtained by mixing
(A) 100 parts by weight of a hydroxyl endblocked polydiorganosiloxane where the organic radicals are monovalent radicals selected from the group consisting of methyl, vinyl, phenyl, and 3,3,3-trifluoropropyl radicals, the organic radicals being at least 50 mol percent methyl radicals, the viscosity of the polydiorganosiloxane being from 0.05 Pa·s to 100 Pa·s at 25° C.
(B) a silane selected from the group consisting of a silane of the formula $CH_3RSiX_2$ in which R is selected from the group consisting of methyl and vinyl radicals, X is a monovalent amido radical selected from the group consisting of

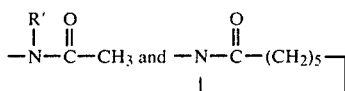

where R' is a monovalent radical selected from the group consisting of an alkyl radical of from 1 to 4 carbon atoms per radical and phenyl radical and a silane of the formula

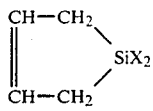

in which X is as defined above, the silane being present in an amount sufficient to provide at least one mole of silane per mole of available hydroxyl radical in the composition,
(C) from 0 to 150 parts by weight of nonacidic filler, and
(D) from 0.1 to 8 parts by weight of an organic peroxide suitable for vulcanizing silicone rubber.

2. The composition in accordance with claim 1 in which the polydiorganosiloxane is polydimethylsiloxane and the silane is of the formula

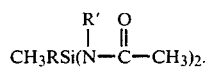

3. The composition in accordance with claim 1 in which the polydiorganosiloxane is polydimethylsiloxane and the silane is of the formula

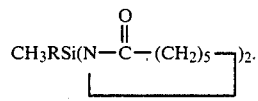

4. The composition in accordance with claim 2 in which the silane is methylvinyldi(N-methylacetamido)silane.

5. The composition in accordance with claim 1 in which the silane is silacyclopentyl-di-epsilon-caprolactam.

6. The composition in accordance with claim 1, in which there is present from 5 to 100 parts of ground quartz filler.

7. The composition in accordance with claim 1, in which there is present from 5 to 50 parts of diatomaceous earth filler.

8. The composition in accordance with claim 1, in which there is present from 5 to 100 parts of calcium carbonate filler.

9. The composition in accordance with claim 4 in which the polydimethylsiloxane has a viscosity of from 0.1 Pa·s to 25 Pa·s at 25° C., the organic peroxide is vinyl specific, and there is from 5 to 50 parts of diatomaceous earth filler, the filler being treated with methylvinyldichlorosilane.

10. The composition in accordance with claim 4 in which there is also present resinous microcapsules containing water.

11. A method of producing a cured silicone elastomer consisting essentially of
(I) mixing under essentially anhydrous conditions
   (A) 100 parts by weight of a hydroxyl endblocked polydiorganosiloxane where the organic radicals are monovalent radicals selected from the group consisting of methyl, vinyl, phenyl, and 3,3,3-trifluoropropyl radicals, the organic radicals being at least 50 mol percent methyl radicals, the viscosity of the polydiorganosiloxane being from 0.05 Pa·s to 100 Pa·s at 25° C. (B) a silane selected from the group consisting of a silane of the formula $CH_3RSiX_2$ in which R is selected from the group consisting of methyl and vinyl radicals, X is a monovalent amido radical selected from the group consisting of

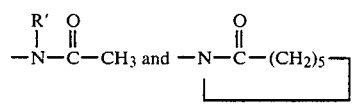

'where R' is a monovalent radical selected from the group consisting of an alkyl radical of from 1 to 4 carbon atoms per radical and phenyl radical and a silane of the formula

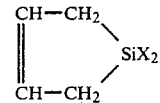

in which X is as defined above, the silane being present in an amount sufficient to provide at least one mole of silane per mole of available hydroxyl radical in the composition,
   (C) from 0 to 150 parts by weight of nonacidic filler, and
   (D) from 0.1 to 8 parts by weight of an organic peroxide suitable for vulcanizing silicone rubber to form a composition,
(II) forming the composition,
(III) exposing the formed composition to moisture sufficient to allow a chain extension reaction, then,
(IV) heating to a temperature sufficient to activate the organic peroxide,
to yield a cured silicone elastomer.

* * * * *